(12) United States Patent
Terada

(10) Patent No.: US 8,340,324 B2
(45) Date of Patent: Dec. 25, 2012

(54) DEVICE FOR SETTING PARAMETERS OF MIXER

(75) Inventor: Kotaro Terada, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 1873 days.

(21) Appl. No.: 11/516,833

(22) Filed: Sep. 6, 2006

(65) Prior Publication Data

US 2007/0064962 A1 Mar. 22, 2007

(30) Foreign Application Priority Data

Sep. 7, 2005 (JP) ................................ 2005-258663

(51) Int. Cl.
*H04B 1/00* (2006.01)
*H02B 1/00* (2006.01)
*H03G 9/00* (2006.01)
*H03G 3/00* (2006.01)
*G10H 1/08* (2006.01)

(52) U.S. Cl. ........ 381/119; 381/123; 381/102; 381/104; 84/625; 84/660

(58) Field of Classification Search ............ 381/119, 381/123, 102–109; 84/625, 660; 700/94

See application file for complete search history.

(56) References Cited

U.S. PATENT DOCUMENTS 5,774,566 A * 6/1998 Huber et al. ............. 381/119

OTHER PUBLICATIONS

PM5D Digital Mixing Console, PM5D-PM5D-RH Owner's Manual, 2004, Yamaha Corporation. Japan.*
PM5D Digital Mixing Console. PM5D-RH Owners Manual 2004. Yamaha Corporation. Japan.*
*PM1D System Software V1.6 Supplemental Manual*, Yamaha Corporation, 2003.

* cited by examiner

*Primary Examiner* — Devona Faulk
(74) *Attorney, Agent, or Firm* — Morrison & Foerster LLP

(57) ABSTRACT

When a copy mode is set, all channel selecting switches on a control panel are set to valid for a parameter copy operation, in which, when an operation of the channel selecting switch is detected while the copy mode is set, (a) in a case where the operation of the channel selecting switch is determined to be a setting operation of a copy-source channel, the channel corresponding to the operated channel selecting switch is set as a copy-source channel and channel selecting switches corresponding to the channel of a different type from a type of the copy-source channel is set invalid so that only the channel selecting switch corresponding to the channel of the same type as of the copy-source channel is placed into a valid state, and (b) in a case where the operation of the channel selecting switch is determined to be the setting operation of a copy-destination channel, the channel corresponding to the channel selecting switch operated is set as a copy-destination channel.

13 Claims, 4 Drawing Sheets

DEVICE FOR SETTING PARAMETERS OF MIXER

BACKGROUND OF THE INVENTION

1. Field of the Invention

The invention relates to a device for setting parameters of a mixer device performing mixing or the like of audio signals, the device being provided with a function of copying a parameter of one channel onto another channel.

2. Description of the Related Art

A mixer device performing a mixing process or the like of audio signals is generally provided with plural input channels and output channels. A variety of multiple parameters can be set onto each channel. For instance, as regards the input channel, equalizer (EQ), gate (gate), compressor (COMP) and the like can be set. The values of these parameters can be set in an arbitrary manner by a user for each channel by operating various controls on a control panel. For the purpose of facilitating the parameter-value setting operation, there is one carrying a function of copying the parameter of one channel onto another channel.

For instance, in the mixer device described in Document 1 below, an input-channel view screen is opened via a menu displayed in a screen, a copy-source channel and a parameter to be copied are selected from the input channel view, and a copy-destination channel is selected further, so that the parameter copy can be performed between the channels. In the input channel view, the channel numbers of all the input channels are displayed by icons indicating numbers, and the numbers of the copy-source channel and the copy-destination channel can be selected by the icons. There are plural types of channels such as the input channel and the output channel, and the parameters of the respective channels are different for each type, so that a channel copy screen is provided for each type. For instance, in the case described in Document 1, an input channel view for copying the parameters of the input channel and an output channel view for copying the parameters of the output channel are provided.

Document 1: "Supplementary Manual for DIGITAL AUDIO MIXING SYSTEM PM1D System Software V.1.6", pp. 24-26, Yamaha Corporation, 2003

SUMMARY OF THE INVENTION

Meanwhile, in the above-described conventional art, a channel copy screen has to be switched in accordance with the type of a channel a user wishes to copy, leaving a problem of complicating a copying work.

An object of the invention is to provide, in a mixer device, an art allowing a between-channel copy to be performed with ease without regard to the types of the channels.

In order to achieve the above-described object, according to the invention, channel selecting switches on a control panel for all channels are set valid for a parameter copy operation when a copy mode is set, and when an operation of the channel selecting switch is detected while the copy mode is set, (a) in a case where the operation of the channel selecting switch is determined to be a setting operation of a copy-source channel, a channel corresponding to the channel selecting switch is set as a copy-source channel and channel selecting switches of the channels of a different type from a type of the copy-source channel is set invalid, and (b) in a case where the operation of the channel selecting switch is determined to the setting operation of a copy-destination channel, a channel corresponding to the channel selecting switch is set as a copy-destination channel.

When it is determined that the channel selecting switch operated is valid and that it is in a state where no copy-source channel is set, the operation of the channel selecting switch is recognized as an operation to set the copy-source channel, while when it is determined that the channel selecting switch operated is valid and that it is in the state where the copy-source channel is set, the operation of the channel selecting switch is recognized as an operation to set the copy-destination channel.

Further, when an execution of the copy is instructed, a parameter of a channel set as a copy-source channel is copied onto a parameter of a channel set as a copy-destination channel, in which, when a plurality of channels are set as the copy-destination channels, then the copy is executed onto all the channels.

When the copy-mode is set, it is preferable that a miniature screen imitating a whole layout of controls of the respective channels of the control panel is displayed on the display such that the miniature screen can be accommodated fully in a single screen without a need of scrolling, and when the copy-source channel is set, it is preferable that, out of the controls of the respective channels displayed in the miniature screen, the display portion of the control corresponding to the channels having a different type from the type of the channel set as a copy-source channel is hidden (including to display in a manner indicating invalid).

Further, the invention may also be realized as a program containing program instructions executable by a computer that has a control panel arranging controls including channel selecting switches thereon and provided in a mixer that processes audio signals of a plurality of channels, and causing the computer to execute a process to realize the above-described operations.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, the best mode for carrying out the invention will be concretely described with reference to the drawings.

Figure 1:
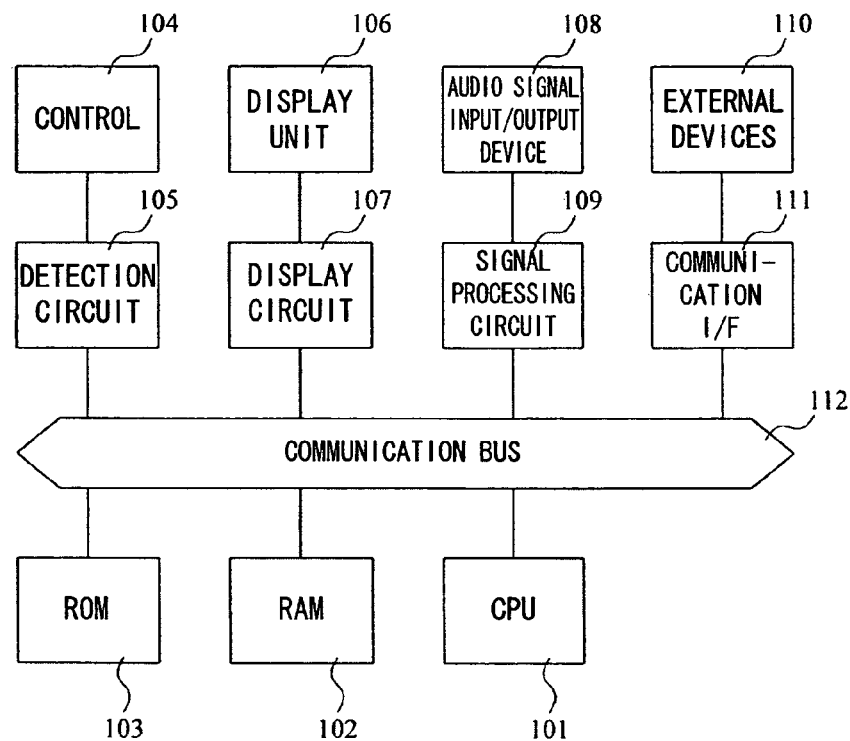
FIG. 1 is a view showing a hardware configuration of a digital mixer according to an embodiment of the invention.

FIG. 1 is a view showing a hardware configuration of a digital mixer being an embodiment of the invention. The digital mixer includes, a central processing unit (CPU) 101, a random access memory (RAM) 102, a read-only memory (ROM) 103, a control 104, a detection circuit 105, a display unit 106, a display circuit 107, an audio signal input/output device 108, a signal processing circuit 109, a communication interface (I/F) 111, and a communication bus 112.

The CPU 101 is a processing unit controlling operations of the entire digital mixer. The RAM 102 is a volatile memory for loading a program to be executed by the CPU 101 and assuring various buffer spaces. The ROM 103 is a nonvolatile memory storing the program to be executed by the CPU 101 and various data. The control 104 is various switches or faders provided on the external control panel of the digital mixer. An operation of the control 104 is detected by the detection circuit 105 and the operational information thereof is sent to the CPU 101. The display unit 106 is a display provided on the control panel of the digital mixer. The display unit 106 is a touch panel, allowing a button displayed on the screen being turned on or the like by being touched. The display circuit 107 displays various information on the display unit 106 in response to the instruction by the CPU 101. The signal processing circuit 109 is a DSP (digital signal processor) executing various microprograms based on the instruction by the CPU 101, and performs a mixing process, an effect addition process, a volume level control process and the like to the signals inputted from the audio signal input/output device 108 to output the processed signals outside via the audio signal input/output device 108. The communication IF 111 is an interface to connect with various external devices 110.

Figure 2:
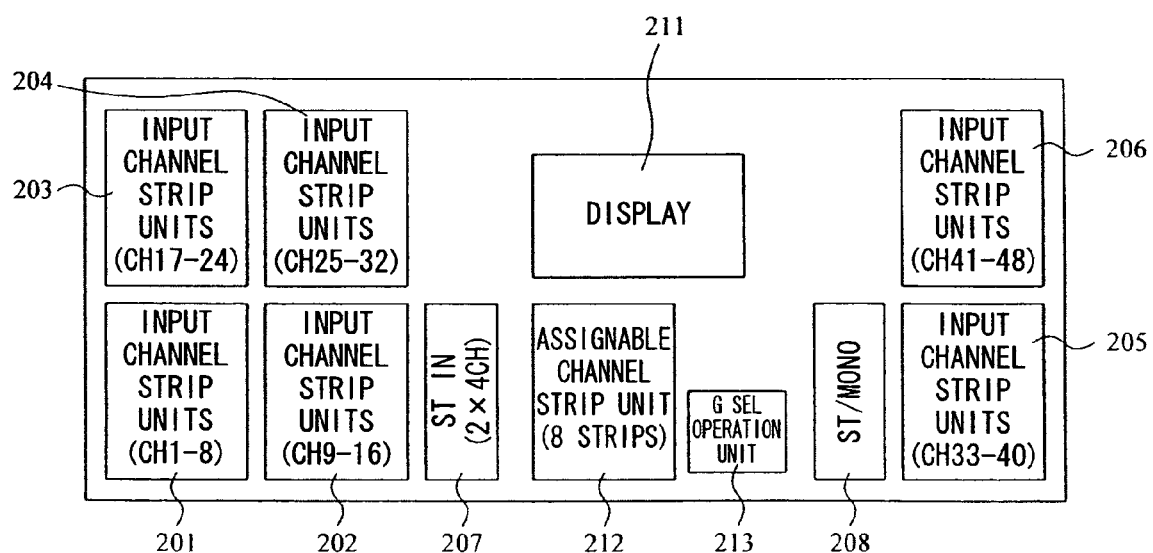
FIG. 2 is a view showing a layout of controls and a display unit on an external control panel.

FIG. 2 shows a layout of the controls 104 and the display unit 106 on the external control panel of the mixer according to the present embodiment. There are provided input channel strip units 201 to 204 on the left side of the control panel, and input channel strip units 205, 206 on the right side thereof. The input channel strip units 201 to 206 respectively include the controls of the 1st to 8th channels, those of the 9th to 16th channels, those of the 17th to 24th channels, those of the 25th to 32nd channels, those of the 33rd to 40th channels and those of the 41st to 48th channels, out of the input channels, sequentially, and therefore each input channel strip unit has the controls for eight channels. An ST input channel strip unit 207 includes controls corresponding to a stereo input channel. An output channel strip unit 208 includes controls corresponding to a stereo output channel and a monaural output channel. "211" denotes a display, "212" denotes an assignable channel strip unit, and "213" denotes a group (G) selecting operation unit.

Figure 3A:
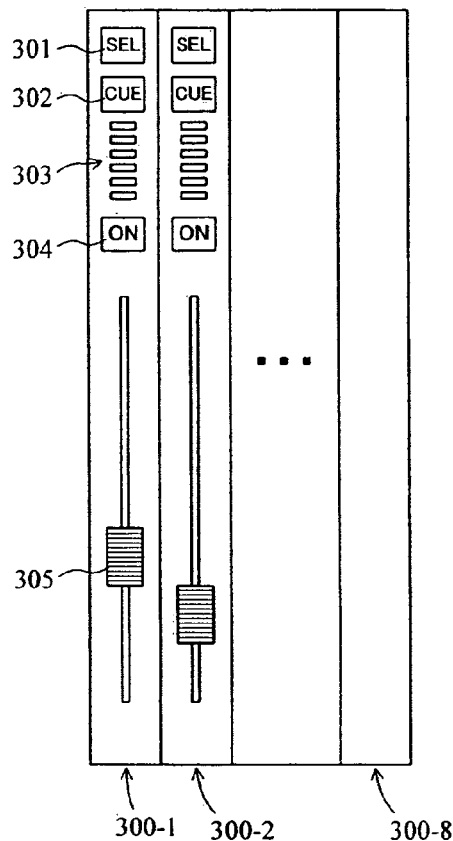
FIG. 3A is a view showing a detail configuration of a channel strip unit.

FIG. 3A shows a detailed configuration of the input channel strip units 201 to 206. Each input channel strip unit includes eight channel strips 300-1 to 300-8. A single channel strip, for example, the channel strip 300-1, includes a SEL switch 301, a CUE switch 302, LEDs 303 for a level meter, an ON switch 304 and a moving fader 305. Each of the switches 301, 302, 304 is provided with an LED lighted when the corresponding switch is turned on and lighted out when the corresponding switch is turned off. The SEL switch 301 is, generally, a channel selecting switch for selecting a channel assigned to the corresponding channel strip and instructing to display a detail parameter setting screen related to the channel to set or change the parameter on that screen. The LED 303 is a meter indicating in real time the value of the level of the signal inputted into the channel. The ON switch 304 is a switch for switching ON/OFF of the signal of the channel. The electric fader 305 is a control for setting the level of the channel. The same configuration is also applicable to the other channel strips 300-2 to 300-8.

The ST input channel strip unit 207 has the same configuration as well. Note that, in the ST input channel strip unit 207, one channel strip corresponds to a paired right and left stereo input channel, and there are four stereo input channels, so that four channel strips are provided for the four pairs. The assignable channel strip unit 212 has the same configuration, and eight channel strips each of which is that as shown in FIG. 3A are provided. The output channel strip unit 208 has the same configuration. However, the output channel strip unit 208 is composed of a channel strip to operate the stereo output channel (a left/right pair) and a channel strip to operate the monaural output (C).

Figure 3B:
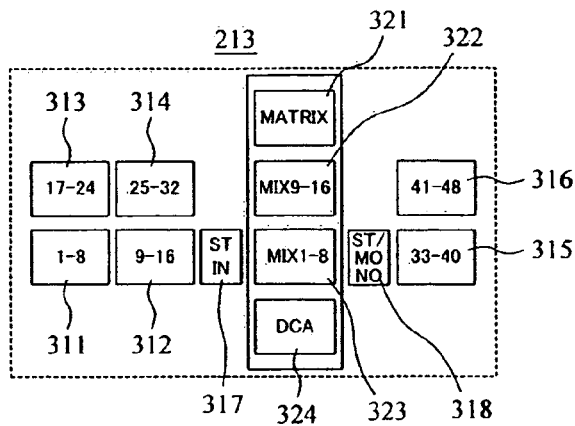
FIG. 3B is a view showing a detail configuration of a group selecting operation unit.

FIG. 3B shows a detail configuration of the group selecting operation unit 213 in FIG. 2. The six selection switches 311 to 316 are controls respectively corresponding to the input channel strip units 201 to 206 in FIG. 2, and for assigning (recalling) the respective input channel strip units to the assignable channel strip unit 212. For instance, when a selection switch 311 is turned on, the input channel strip unit 201 is assigned to the assignable channel strip unit 212 to thereby cause the eight channel strips of the assignable channel strip unit 212 to respectively function as the input channel strips for the 1st to 8th channels. When an STIN switch 317 of the group selecting operation unit 213 is turned on, the ST input channel strip unit 207 in FIG. 2 is assigned to the assignable channel strip unit 212, and when an ST/MONO switch 318 is turned on, the output channel strip unit 208 in FIG. 2 is assigned to the assignable channel strip unit 212, respectively. Note that since the ST input channel strip unit 207 is composed of the four channel strips, and the output channel strip unit 208 is composed of the two channel strips, when they are assigned to the assignable channel strip unit 212, only the leftmost four or two channel strips are become valid, respectively. Also when the input channel strip units 201 to 206 are assigned to the assignable channel strip unit 212, the operations in the input channel strip units 201 to 206 are valid. In other words, in this case, an operation with respect to the same channel can be performed by the input channel strip units 201 to 206 as well as the assignable channel strip unit 212.

The above-described selection switches 311 and 312 are those to allow an operator to operate with the control at the center without moving right and left by assigning the channel strip units 201 to 208 provided on the control panel in FIG. 2 to the assignable channel strip unit 212. Meanwhile, "321" to "324" are assignment switches to operate internal channels not existing on the control panel. The "321" denotes a selection switch designating to use the assignable channel strip unit 212 as controls to operate the respective channels of output channels (eight channels) of a matrix bus provided internally. The "322" and "323"-are selection switches designating to use the assignable channel strip unit 212 as controls to operate, out of MIX output channels of a MIX bus provided internally, the 9th to 16th channels and the 1st to 8th channels, respectively. The same is equally applicable to a DCA selection switch 324.

From the viewpoint of the channel type, the input channel selectable by the switches 311 to 316 and the stereo input channel selectable by the STIN switch 317 are input channels, and the stereo output channel and monaural output channel selectable by the switch 318 and the internal channel selectable by the switches 321 to 324 are output channels. The input channel and the output channel respectively have a different parameter settable thereto (some parameters are common, however, basically, their parameters are different from each other).

Figure 4:
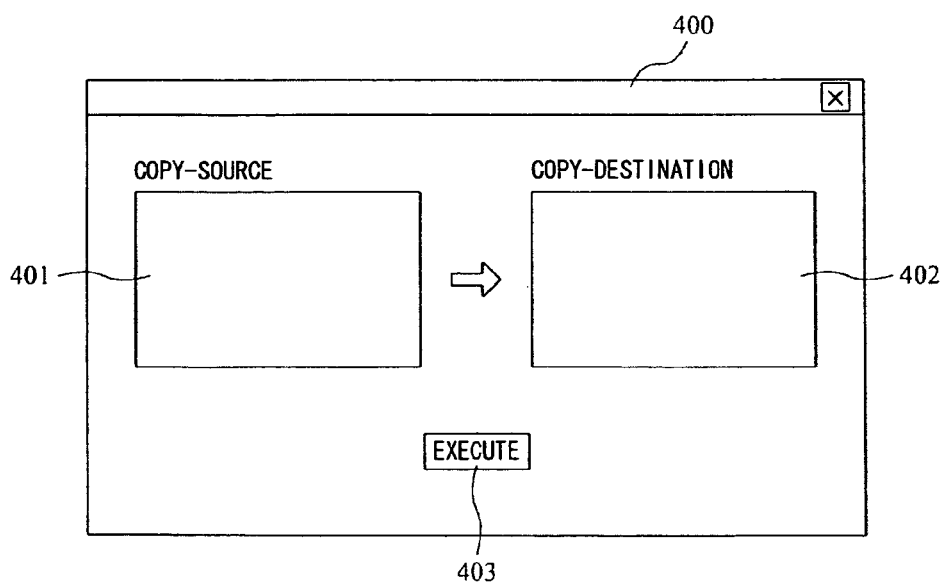
FIG. 4 is a view showing a display example of a copy screen.

FIG. 4 shows a copy screen 400 for instructing copy of the parameters between the channels. The copy screen 400 is displayed on the display 211 in FIG. 2 by selecting a parameter copy between. channels from a predetermined menu. Note that it is also possible to provide a switch or the like for instructing to perform the copy between channels to thereby display the copy screen 400 in accordance with the operation of the switch. In FIG. 4, in the copy screen 400, a copy-source display area 401 and a copy-destination display area 402 are provided, and an execution button 403 is displayed. When the copy screen 400 is displayed first, the frame line of the copy-source display area 401 is indicated as a bold line, and in the area 401, a miniature screen of the controls of the respective channels operatable on the control panel described in FIG. 2 to FIG. 3B are displayed. The bold line is adopted for the frame line of the copy-source display area 401 to indicate that what can be set at this time is the copy-source channel. At the initial state where the copy screen 400 is shown first, the copy-destination display area 402 is blank.

Figure 5:
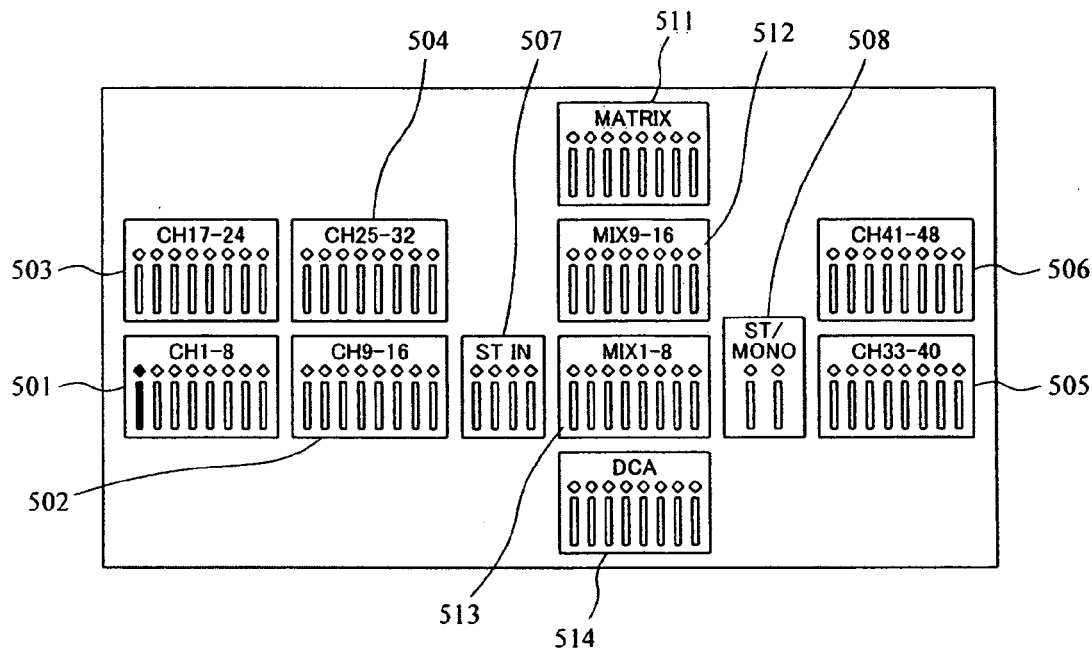
FIG. 5 is a view showing a display example of a miniature screen displayed in a copy-source display area.

FIG. 5 shows a display example of the miniature screen displayed in the copy-source display area 401. The miniature screen is displayed to correspond to the layout of the controls of the respective channels on the control panel. In other words, in the miniature screen, a channel display element to indicate whether or not the corresponding channel is selected is displayed for each of all the channels in a manner coinciding with the layout of the respective channel strips on the control panel. For instance, "501" to "506" are displayed to correspond to the controls of the channels 1 to 48 of the input channel strip units 201 to 206 on the control panel in FIG. 2. When make a close attention on "501", the channel display elements for channels 1 to 8 are displayed. Further, "507" and "508" are displayed in a corresponding manner to the stereo input channel strip unit 207 and the output channel strip unit 208. Furthermore, for the internal channels selectable by the switches 321 to 324 of the group selecting operation unit 213 in FIG. 3B, similarly, channel display elements imitating the controls of the respective channels like "511" to "514" is displayed in the miniature screen, even though channel strips corresponding to the internal channels do not exist on the control panel.

At the initial state where the copy screen 400 is displayed first, the copy-source channel is not selected yet, so that in the miniature screen in FIG. 5, the channel display elements of the respective channels are all displayed normally (not reversed). In this state, when a user turns on any SEL switch on the control panel, the channel corresponding to the SEL switch is set as a copy-source channel. The channel set as a copy-source channel is displayed on the miniature screen in FIG. 5 such that the channel display element of the channel is reversed (the channel display element may be displayed in a highlighted manner, a different color, or the like). FIG. 5 shows a state where the channel 1 is set as a copy-source channel. When the copy-source channel is set, the frame line of the copy-source display area 401 is changed from the bold line to the normal line (the display in the area 401 is kept as it is), and then the frame line of the copy-destination display area 402 is changed to the bold line. Meanwhile, in the copy-destination display area 402, a listing of selectable copy-destination channels is displayed in accordance with the type of the channel selected as a copy-source channel. A display example of the copy-destination display area 402 will be described later in FIG. 6. In the state where the copy-source channel is set, when the copy-source display area 401 is touched, the settings of the copy-source channel and copy-destination channel are all canceled (and the screen returns to the initial state where the copy screen 400 is displayed first), so that the setting can be started again from the setting of the copy-source channel.

Note that the output channels displayed in the display portions 511 to 514 have no SEL switch enabling a direct operation of the channels on the control panel, therefore, the SEL switch of the assignable channel strip unit 212 in FIG. 2 is required to be operated after selecting a layer by the switches 321 to 324 of the group selecting operation unit 213 in FIG. 3B. The same is equally applicable to the case where the copy-destination channel is set, which will be described next.

Figure 6:
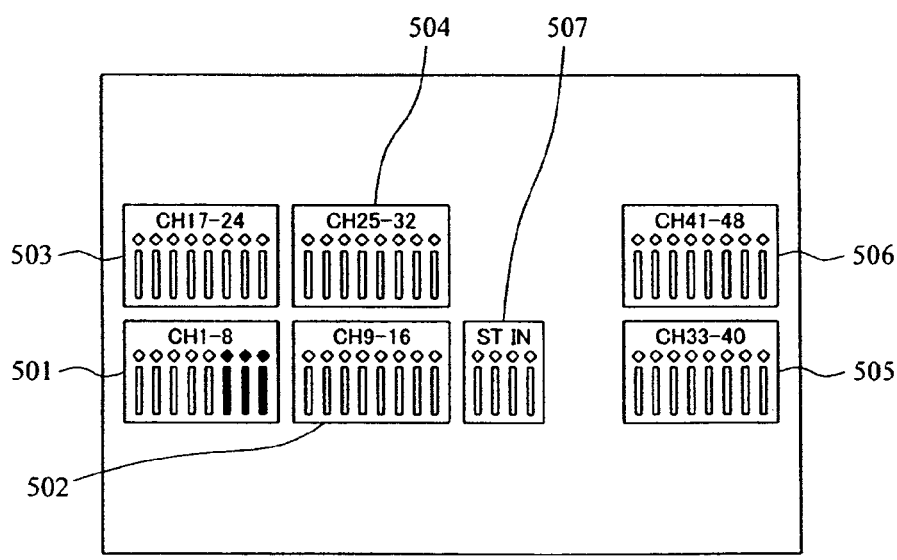
FIG. 6 is a view showing a display example of a miniature screen displayed in a copy-destination display area.

FIG. 6 shows a display example of the copy-source display area 402. Assuming that the channel 1 is selected as a copy-source channel at this time, since the type thereof is the input channel, only the channel display elements for the channels selectable as copy-destination channels, namely the input channels, are displayed in the copy-destination display area 402. Conversely, the channel display elements for the output channels (508 and 511 to 514 in FIG. 5) are hidden. In the initial state of the copy-destination display area 402, the channel display elements of all channels are normally displayed. In this state, the SEL switch of any channel on the control panel is operated to set the copy-destination channel. The plural copy-destination channels can be set. The channel display element of the channel set as a copy-destination channel is displayed in a reversed manner (it may also be highlighted, displayed with a different color, or the like). FIG. 6 shows a state where the channels 6 to 8 are set as copy-destination channels. The channels selectable as copy-destination channels are determined depending on the type of the copy-source channel, so that the SEL switches of the channels (namely, those hidden in FIG. 6) other than the selectable channels are made invalid in view of operation. When the execution button 403 is turned on after one or more copy-destination channel(s) is (are) selected, the copy is executed.

In FIG. 6, the display example of the copy-destination display area 402 displaying only the input channels is shown, however, when the output channel is set as a copy-source channel, only the output channels (508 and 511 to 514 in the case of FIG. 5) are displayed in the copy-destination display area 402.

Note that, when the copy-destination channel is set, the SEL switch can be set/canceled in toggle manner. In other words, when the SEL switch of the channel once set as a copy-destination channel is turned on again, the setting as a copy-destination channel is canceled. Further, when the copy screen 400 is displayed, only the SEL switches of the respective channels are used as switches to select the copy-source or copy-destination channels, and the controls other than the SEL switches are designed to hold the functions as they are before the copy screen 400 is displayed. Accordingly, even in the state where the copy screen 400 is displayed, when operating the fader 305 corresponding to a channel, the level adjustment can be performed for the channel.

Figure 7:
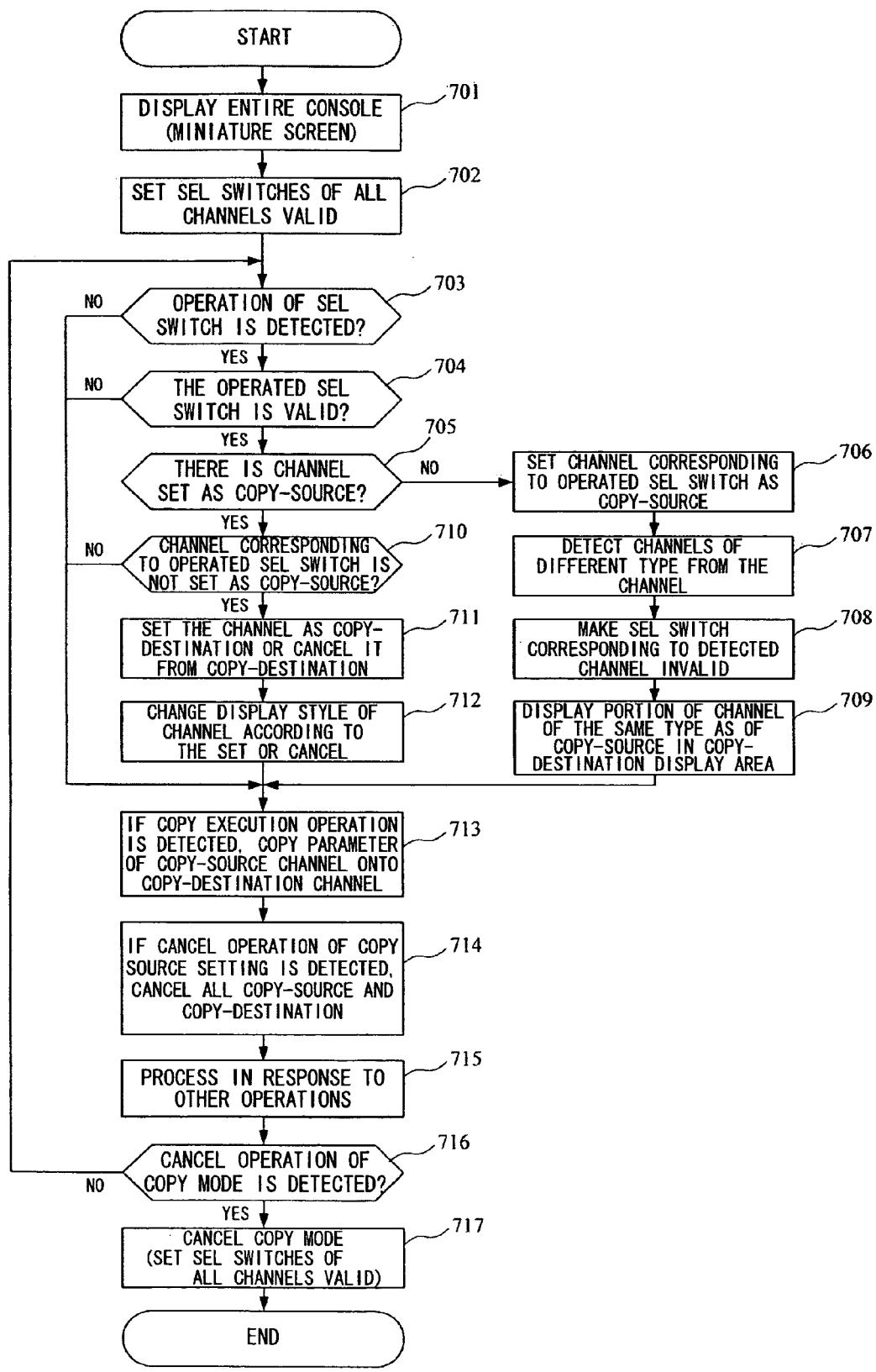
FIG. 7 is a flowchart showing procedures of a process in a copy mode.

FIG. 7 shows procedures for a process in a copy mode activated when a parameter-copy between channels is instructed from a predetermined menu. In Step 701, the copy screen 400 in the above-described initial state is displayed, and the miniature screen showing whole consoles are displayed in the copy-source display area 401. As described in FIG. 5, the miniature screen is designed to display whole consoles on a single screen (without the need of a scrolling) in an imitating manner. In Step 702, the SEL switches of all the channels are set valid. This is to make the SEL switch valid as a selection switch for selecting a copy-source channel or a copy-destination channel. Subsequently, in Step 703, it is determined whether or not the operation of the SEL switch is detected. If the operation is detected, whether or not the SEL switch is valid is determined in Step 704. If it is determined to be valid, in Step 705, whether or not the channel already set as a copy-source channel exists is determined. If no copy-source channel exists, the channel corresponding to the operated SEL switch is set as a copy-source channel in Step 706. Next, in Step 707, the channel of a different type from the type of the aforementioned channel is detected. In Step 708, the SEL switch of the detected channel is made invalid. This is a process to make only such the SEL switches valid that corresponds to the channels of the same type as of the channel selected as a copy-source channel. Subsequently, in Step 709, the frame line of the copy-source display area 401 of the copy screen 400 is changed from the bold line to the normal line, the frame line of the copy-destination display area 402 is changed to the bold line, and the channel of the same type as of the copy-source channel is displayed in the copy-destination display area 402, as described in FIG. 6, to go to Step 713.

If there is a channel already set as a copy-source channel in Step 705, whether or not the channel which corresponds to the SEL switch operation of which is detected in Step 708, and the channel already set as a copy-source channel are the same is determined in Step 710. If it is not the same, the fact means that the copy-destination channel is selected, so that the channel corresponding to the operated SEL switch is set as a copy-destination channel in Step 711, or if the channel is already set as a copy-destination channel, then the channel is canceled from a copy-destination channel. Subsequently, in Step 712, the display style of the channel display element of the channel is changed according to the setting and cancel of the copy-destination channel (that set is displayed reversely and that canceled is displayed normally), and then the process goes to Step 713. If no operation of SEL switch is detected in Step 703, if the operated SEL switch is invalid in Step 704, or if the channel of which operation is detected in Step 710 is the channel already set as a copy-source channel, then the process directly go to Step 713.

In Step 713, whether or not an executive operation of copy (turning on of the execution button 403 in FIG. 4) is detected is checked, and if the executive operation is performed, then the parameters of the channel set as a copy-source channel is copied onto the channel set as a copy-destination channel. If there are two or more copy-destination channels, then the copy is performed onto all of them. Subsequently, in Step 714, whether or not the canceling operation of the setting of the copy-source channel is detected is checked, and if the canceling operation is performed, all the copy-source and copy-destination channels set at that time are cancelled. Note that the canceling operation of the setting of the copy-source channel is the touching operation of the copy-source display area 401 in a state where the copy-source channel is set, as described using FIG. 5.

Subsequently, in Step 715, the process in response to other operations is performed. In Step 716, whether or not the canceling operation (an operation of turning on the "close" button at an upper right of the copy screen 400 in FIG. 4) of the copy mode is detected is determined, and if the canceling operation is performed, then the copy mode is cancelled in Step 717. With this, the SEL switches of all the channels are set valid as those having the original functions. If the canceling operation is not performed, the process is returned from Step 716 to Step 703 and continued.

Note that, in the display example of the copy-destination display area in FIG. 6, only the channels of the same type as of the channel set as a copy-source channel are displayed, however, it is also possible to display every channels in the same manner as in FIG. 5 and display those valid portions in a recognizable manner. For instance, the portion of invalid channel(s) may be displayed by being grayed out or the like. In other words, changing display such that the portion of the channel(s) of the different type from the type of the channel set as a copy-source channel is displayed in a specific and not-highlighted manner is also within the scope of the "hidden/not displayed" of the invention. In short, it is acceptable that the portion of the channel(s) of the same type as of the channel set as a copy-source channel is displayed in a highlighted manner.

Further, in addition to that the copy-source and copy-destination channels are set by the SEL switches, it is also acceptable that the settings can be performed by touching the display element portions of the respective channels displayed on the copy screen. Moreover, in the copy screen in FIG. 4, the copy-source display area 401 and the copy-destination display area 402 are displayed separately, however, it is also acceptable that both of them are displayed in a single miniature screen such that the copy-source channel can be distinguished from the copy-destination channel(s) by using a mutually different color for the channel display element when the channel is selected.

As is apparent from the above-described description, according to the invention, without regard to the types of the channels such as the input channel and the output channel, the parameter copy between the channels can be performed by the same operation, so that the copying work is facilitated and the operating efficiency is improved. The copying work is sensuous and easily understandable, so that the operationality is improved.

What is claimed is:

1. A device for setting parameters of a mixer which processes audio signals in a plurality of channels including input-type channels and output-type channels, comprising:
    a control panel for adjusting a parameter of each of the channels, said control panel being provided with controls including channel selecting switches assembled on the control panel, the channel selecting switches corresponding to each of the channels including the input-type channels and the output-type channels for selecting the channels;
    a first controller that sets a copy mode, the copy mode operable to perform a copy operation for input-type channels and a copy operation for output-type channels;
    a second controller, when the copy mode is set, that sets all the channel selecting switches on said control panel to valid for a parameter-copy operation; and
    a third controller, when an operation of a channel selecting switch of said channel selecting switches is detected while the copy mode is set,
    (a) in a case where the operation of the channel selecting switch is determined to be an operation to select a copy-source channel, that selects the channel corresponding to the operated channel selecting switch as the copy-source channel and sets the channel selecting switches corresponding to the channel of a different type from a type of the copy-source channel to invalid to thereby place only the channel selecting switches corresponding to the channels of the same type as the copy-source channel into a valid state, and
    (b) in a case where the operation of the channel selecting switch is determined to be an operation to select a copy-destination channel, that selects the channel corresponding to the operated channel selecting switch as the copy-destination channel.

2. A device for setting the parameters of a mixer according to claim 1,
    wherein, at a time of detecting the operation of the channel selecting switch while the copy mode is set, if it is determined that the operated channel selecting switch is valid and that no channel is selected as the copy-source channel, the operation of the channel selecting switch is determined to be the operation to select the copy-source channel.

3. A device for setting the parameters of a mixer according to claim 1,
wherein, at a time of detecting the operation of the channel selecting switch while the copy mode is set, when it is determined that the operated channel selecting switch is valid and that a channel is selected as the copy-destination channel, the operation of the channel selecting switch is determined to be the operation to select the copy-destination channel.

4. A device for setting the parameters of a mixer according to claim 1, further comprising:
a copy instructor that instructs to execute a copy; and
a copy executor that copies the parameter of the channel selected as the copy-source channel onto the parameter of the channel selected as the copy-destination channel when the execution of the copy is instructed, in which, in a case where a plurality of channels are selected as the copy-destination channels, the copy is executed onto every copy-destination channel.

5. A device for setting parameters of a mixer which processes audio signals in a plurality of channels, comprising:
a control panel for adjusting a parameter of each channel, said control panel being provided with controls including channel selecting switches thereon;
a first controller that sets a copy mode;
a second controller, when the copy mode is set, that sets all the channel selecting switches on said control panel to valid for a parameter-copy operation;
a third controller, when an operation of a channel selecting switch of said channel selecting switches is detected while the copy mode is set,
(a) in a case where the operation of the channel selecting switch is determined to be an operation to select a copy-source channel, that selects the channel corresponding to the operated channel selecting switch as the copy-source channel and sets the channel selecting switches corresponding to the channel of a different type from a type of the copy-source channel to invalid to thereby place only the channel selecting switches corresponding to the channel of the same type as the copy-source channel into a valid state, and
(b) in a case where the operation of the channel selecting switch is determined to be an operation to select a copy-destination channel, that selects the channel corresponding to the operated channel selecting switch as the copy-destination channel;
a display provided on said control panel;
a first display controller that displays a miniature screen imitating a whole layout of the controls of the respective channels of said control panel on said display so that the miniature screen can be accommodated fully in a single screen without a need of scrolling; and
a second display controller that hides, out of the controls of the respective channels displayed in the miniature screen, the portion of the control corresponding to the channel of a different type from the type of the channel selected as the copy-source channel, when a channel is selected as the copy-source channel.

6. A non-transitory computer-readable medium storing a program containing program instructions executable by a computer provided in a mixer which processes audio signals in a plurality of channels including input-type channels and output-type channels and comprises a control panel for adjusting a parameter of each of the channels, said control panel being provided with controls with channel selecting switches assembled on the control panel, the channel selecting switches corresponding to each of the channels including the input-type channels and the output-type channels for selecting the channels, and causing the computer to execute:
a first control process of setting a copy mode, the copy mode operable to perform a copy operation for input-type channels and a copy operation for output-type channels;
a second control process of setting all the channel selecting switches on the control panel to valid for a parameter-copy operation when the copy mode is set; and
a third control process of, when an operation of a channel selecting switch of said channel selecting switches is detected while the copy mode is set,
(a) in a case where the operation of the channel selecting switch is determined to be an operation to select a copy-source channel, selecting the channel corresponding to the operated channel selecting switch as the copy-source channel and setting the channel selecting switches corresponding to the channel of a different type from a type of the copy-source channel to invalid to thereby place only the channel selecting switches corresponding to the channels of the same type as the copy-source channel into a valid state, and
(b) in a case where the operation of the channel selecting switch is determined to be an operation to select a copy-destination channel, selecting the channel corresponding to the operated channel selecting switch as the copy-destination channel.

7. A device for setting parameters of a mixer which processes audio signals in a plurality of channels including input-type channels and output-type channels, comprising:
a controller for adjusting a parameter of each of the channels, said controller being provided with channel selecting portions, the channel selecting portions corresponding to each of the channels including the input-type channels and the output-type channels for selecting the channels upon operation thereon by a user;
a first controller that sets a copy mode, the copy mode operable to perform a copy operation for input-type channels and a copy operation for output-type channels;
a second controller, when the copy mode is set, that sets all the channel selecting portions of said controller to valid for a parameter-copy operation; and
a third controller, when an operation of a channel selecting portion of said channel selecting portions is detected while the copy mode is set,
(a) in a case where the operation of the channel selecting portion is determined to be an operation to select a copy-source channel, that selects the channel corresponding to the operated channel selecting portion as the copy-source channel and sets the channel selecting portions corresponding to the channel of a different type from a type of the copy-source channel to invalid to thereby place only the channel selecting portions corresponding to the channels of the same type as the copy-source channel into a valid state, and
(b) in a case where the operation of the channel selecting portion is determined to be an operation to select a copy-destination channel, that selects the channel corresponding to the operated channel selecting portion as the copy-destination channel.

8. A device for setting the parameters of a mixer according to claim 7, said channel selecting portion is a switch provided on a control panel.

9. A device for setting the parameters of a mixer according to claim 7, said channel selecting portion is a display element displayed on a touch panel.

10. A device for setting the parameters of a mixer according to claim 9, further comprising:
a display controller that hides, out of the channel selecting portions of the respective channels displayed on the touch panel, the channel selecting portions corresponding to the channel of a different type from the type of the channel selected as the copy-source channel, when a channel is selected as the copy-source channel.

11. A device for setting parameters of a mixer which processes audio signals in a plurality of channels, comprising:
a control panel for adjusting a parameter of each of the channels, said control panel being provided with controls including channel selecting switches assembled on the control panel, the channel selecting switches corresponding to each of the channels for selecting the channels;
a first controller that sets a copy mode;
a second controller, when the copy mode is set, that sets all the channel selecting switches on said control panel to valid for a parameter-copy operation; and
a third controller, when an operation of a channel selecting switch of said channel selecting switches is detected while the copy mode is set, the channel selecting switch operable to select a copy-source channel and operable to select a copy-destination channel,
(a) in a case where the operation of the channel selecting switch is determined to be an operation to select a copy-source channel, that selects the channel corresponding to the operated channel selecting switch as the copy-source channel and sets the channel selecting switches corresponding to the channel of a different type from a type of the copy-source channel to invalid to thereby place only the channel selecting switches corresponding to the channels of the same type as the copy-source channel into a valid state, and
(b) in a case where the operation of the channel selecting switch is determined to be an operation to select a copy-destination channel, that selects the channel corresponding to the operated channel selecting switch as the copy-destination channel.

12. A non-transitory computer-readable medium storing a program containing program instructions executable by a computer provided in a mixer which processes audio signals in a plurality of channels and comprises a control panel for adjusting a parameter of each of the channels, said control panel being provided with controls with channel selecting switches assembled on the control panel, the channel selecting switches corresponding to each of the channels for selecting the channels, and causing the computer to execute:
a first control process of setting a copy mode;
a second control process of setting all the channel selecting switches on the control panel to valid for a parameter-copy operation when the copy mode is set; and
a third control process of, when an operation of a channel selecting switch of said channel selecting switches is detected while the copy mode is set, the channel selecting switch operable to select a copy-source channel and operable to select a copy-destination channel,
(a) in a case where the operation of the channel selecting switch is determined to be an operation to select a copy-source channel, selecting the channel corresponding to the operated channel selecting switch as the copy-source channel and setting the channel selecting switches corresponding to the channel of a different type from a type of the copy-source channel to invalid to thereby place only the channel selecting switches corresponding to the channels of the same type as the copy-source channel into a valid state, and
(b) in a case where the operation of the channel selecting switch is determined to be an operation to select a copy-destination channel, selecting the channel corresponding to the operated channel selecting switch as the copy-destination channel.

13. A device for setting parameters of a mixer which processes audio signals in a plurality of channels, comprising:
a controller for adjusting a parameter of each of the channels, said controller being provided with channel selecting portions, the channel selecting portions corresponding to each of the channels for selecting the channels upon operation thereon by a user;
a first controller that sets a copy mode;
a second controller, when the copy mode is set, that sets all the channel selecting portions of said controller to valid for a parameter-copy operation; and
a third controller, when an operation of a channel selecting portion of said channel selecting portions is detected while the copy mode is set, the channel selecting portion operable to select a copy-source channel and operable to select a copy-destination channel,
(a) in a case where the operation of the channel selecting portion is determined to be an operation to select a copy-source channel, that selects the channel corresponding to the operated channel selecting portion as the copy-source channel and sets the channel selecting portions corresponding to the channel of a different type from a type of the copy-source channel to invalid to thereby place only the channel selecting portions corresponding to the channels of the same type as the copy-source channel into a valid state, and
(b) in a case where the operation of the channel selecting portion is determined to be an operation to select a copy-destination channel, that selects the channel corresponding to the operated channel selecting portion as the copy-destination channel.

* * * * *